(12) United States Patent
Feller

(10) Patent No.: US 7,587,947 B1
(45) Date of Patent: Sep. 15, 2009

(54) MAGNETIC FLOW METER WITH SELECTIVE ELECTRODE POSITIONING

(76) Inventor: Murray F Feller, 21577 NW. 75th Avenue Rd., Micanopy, FL (US) 32667

( * ) Notice: Subject to any disclaimer, the term of this patent is extended or adjusted under 35 U.S.C. 154(b) by 0 days.

(21) Appl. No.: 12/356,881

(22) Filed: Jan. 21, 2009

(51) Int. Cl.
*G01F 1/58* (2006.01)
(52) U.S. Cl. .................................. 73/861.12
(58) Field of Classification Search ............. 73/861.12, 73/831.14, 861.16, 861.17, 861.15
See application file for complete search history.

(56) References Cited

U.S. PATENT DOCUMENTS

| | | | |
|---|---|---|---|
| 3,406,569 A | 10/1968 | Rohmann | |
| 3,575,051 A * | 4/1971 | Moore | 73/861.16 |
| 4,524,627 A * | 6/1985 | Yamasaki et al. | 73/861.12 |
| 4,736,635 A | 4/1988 | Murase | |
| 4,938,073 A | 7/1990 | Stephenson | |
| 6,571,642 B1 | 6/2003 | Feller | |
| 6,802,223 B2 * | 10/2004 | Nakatani et al. | 73/861.12 |
| 6,843,136 B2 | 1/2005 | Hofmann et al. | |

* cited by examiner

*Primary Examiner*—Jewel Thompson
(74) *Attorney, Agent, or Firm*—David Kiewit

(57) ABSTRACT

A magnetic flow meter has an electrically insulating member extending inward from an inner wall of a flow tube and extending along a selected axial portion of the tube. At least one pair of electrodes are placed adjacent opposite sides of the insulating member at a selected axial position so as to define a voltage sensing path. At least one of the electrodes is connected to an adjustment mechanism that allows the electrode to be set at a selected radial position, where the position can be selected so that the sensed voltage varies linearly with volumetric flow rate.

10 Claims, 2 Drawing Sheets

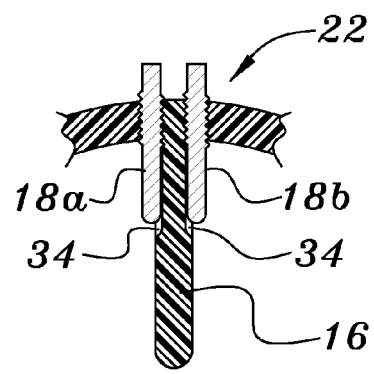
FIG. 3
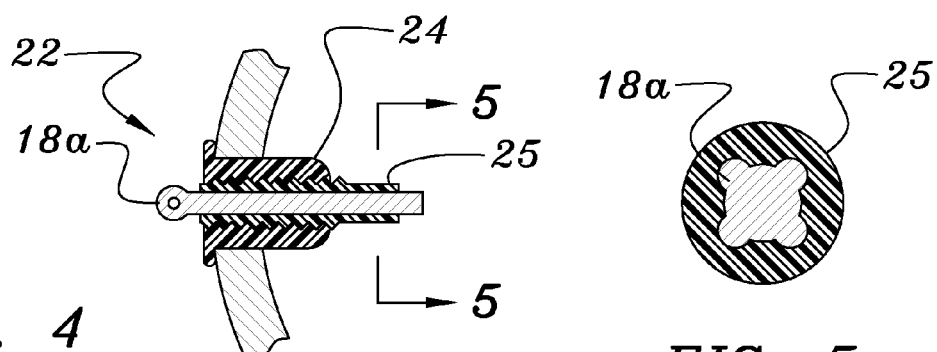
FIG. 4
FIG. 5
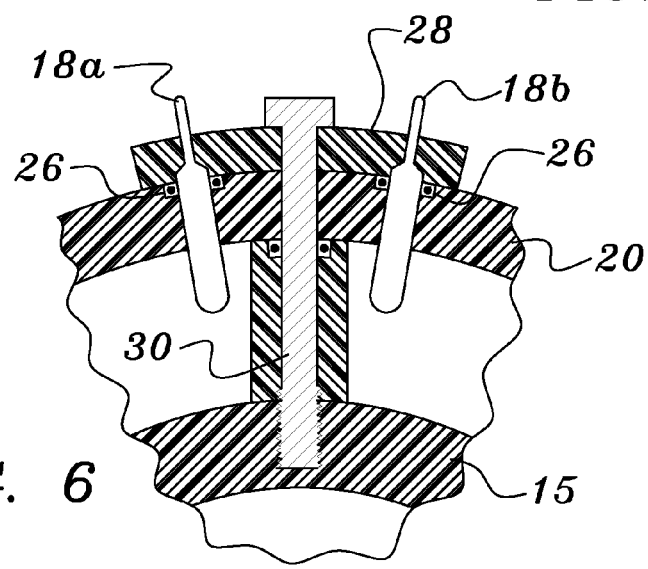
FIG. 6

MAGNETIC FLOW METER WITH SELECTIVE ELECTRODE POSITIONING

BACKGROUND OF THE INVENTION

1. Field of the Invention

This invention relates to apparatus and method for determining the rate of flow of a fluid by measuring the electrical potential difference developed in the fluid as the fluid moves through a magnetic field.

2. Background Information

In many prior art in-line magnetic flow meters, an electrical potential difference developed in the fluid is generally sensed by a pair of electrodes contacting the liquid and spaced apart from each other by a voltage sensing path essentially equal to the diameter of a flow sensing passage. A magnetic field generated orthogonal to both the axis between the electrodes and the direction of flow through the sensing passage is provided by two coils of wire located on opposite sides of and outside of the passage.

It is well known in the flow measurement arts that the velocity of a small volume of a fluid flowing in a pipe varies with the radial position of the small volume. The maximum velocity is commonly found along the axis of a pipe and the minimum velocity along the walls of the pipe. Moreover, the flow profile commonly changes with flow rate for any particular selection of fluid, and operating temperature. Many flow sensing technologies, such as turbine meters, use sensors configured as probes that can be located a selected radial position within the flowing fluid. This position is selected to be one at which the flow signal varies linearly with the actual overall flow rate. This sort of selective sensor positioning is not available in prior art magnetic flow meters, partly because of a need to maintain the largest possible voltage sensing path in order to have a measurable flow signal.

In his U.S. Pat. No. 6,571,642, the entire disclosure of which is herein incorporated by reference, the inventor taught arrangements for increasing the measured signal voltage by increasing the length of the flow sensing path at the expense of an increase in pressure drop. As generally depicted in FIG. 1, these arrangements generally comprised providing a streamlined body extending along the axis of the sensing passage and supported by a vane extending inwardly from a wall of the flow sensing passage. These arrangements generally provided a quasi-annular voltage sensing path extending around the circumference of the flow passage between two electrodes located exposed on opposite sides of the support vane.

BRIEF SUMMARY OF THE INVENTION

One aspect of the invention is that it provides a magnetic flow meter apparatus for measuring the flow rate of a fluid in a tube. This apparatus comprises an electrically insulating member extending inward from an inner wall of the tube and extending along a selected axial portion of the tube. The apparatus further comprises at least one pair of electrodes respectively disposed adjacent opposite sides of the insulating member at a selected axial position so as to define an extended voltage sensing path. Moreover, at least one of the electrodes is selectively radially positionable within the flow tube by the operation of a suitable adjustment mechanism.

Another aspect of the invention is that it provides a method of selecting a signal generating path within a magnetic flow meter. A preferred such method involves, inter alia, providing a magnetic flow meter having an electrically insulating member extending radially inward from an inner wall of a tube in which a flow of fluid is to be measured, so as to aid in defining an extended voltage sensing path. This flow meter further has at least one pair of electrodes respectively disposed on opposite sides of the insulating member at a selected axial position. At least one of the electrodes has an associated adjustment mechanism operable to move the respective electrode radially within the tube. When the fluid is flowing within the tube one can then employ the adjustment mechanism to move at least one of the electrodes radially within the tube until a radial setting is found at which an optimal output is found. This optimal output, as mentioned previously, is one that is linear with overall flow, which is generally understood as the volumetric flow, where the overall flow rate may be measured by another sensing arrangement during calibration.

Yet another aspect of the invention is that it provides a method of making a plurality of production magnetic flow meters by first making a test flow meter having the characteristics described above; operating the test meter in accord with the method described above to select optimal electrode positions, and then making a plurality of production meters identical to the test meter save for the lack of the adjusting mechanisms, so that each of the production flow meters has electrodes positioned at the preferred positions.

Although it is believed that the foregoing rather broad summary description may be of use to one who is skilled in the art and who wishes to learn how to practice the invention, it will be recognized that the foregoing recital is not intended to list all of the features and advantages. Those skilled in the art will appreciate that they may readily use both the underlying ideas and the specific embodiments disclosed in the following Detailed Description as a basis for designing other arrangements for carrying out the same purposes of the present invention and that such equivalent constructions are within the spirit and scope of the invention in its broadest form. Moreover, it may be noted that different embodiments of the invention may provide various combinations of the recited features and advantages of the invention, and that less than all of the recited features and advantages may be provided by some embodiments.

BRIEF DESCRIPTION OF THE SEVERAL VIEWS OF THE DRAWING

FIG. 3 is a detailed cross-sectional view of electrodes disposed in grooves formed in an insulating body.

FIG. 4 is a detailed cross-sectional view of an electrode threadably adjustable in a metal pipe.

FIG. 5 is a cross-sectional view of the electrode of FIG. 4, the section taken as indicated by the double-headed arrow 5-5 in FIG. 4.

FIG. 6 is a cross-sectional detail view of electrodes of the invention disposed adjacent a vane supporting an inner flow tube.

DETAILED DESCRIPTION OF A PREFERRED EMBODIMENT

In studying this Detailed Description, the reader may be aided by noting definitions of certain words and phrases used throughout this patent document. Wherever those definitions are provided, those of ordinary skill in the art should understand that in many, if not most instances, such definitions apply to both preceding and following uses of such defined words and phrases. At the outset of this Description, one may note that the terms "include" and "comprise," as well as derivatives thereof, mean inclusion without limitation; the term "or," is inclusive, meaning and/or.

Figure 1:
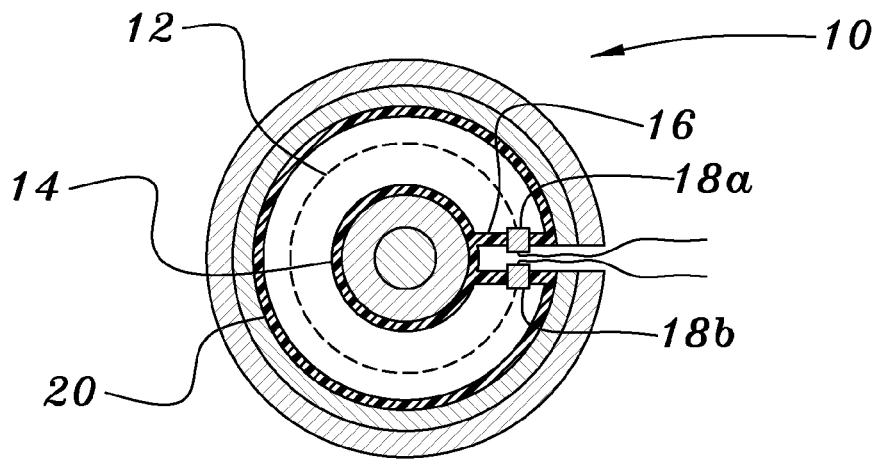
FIG. 1 is a cross-sectional view of a portion of a prior art flow meter described in the inventor's U.S. Pat. No. 6,571,642. In this, and other figures of the drawing, the magnetic field sources and the signal processing circuits, which are conventional, are omitted in the interest of clarity of presentation.

Turning now to FIG. 1 of the drawing, one finds a portion of a magnetic flow meter 10 having an extended, quasi-annular voltage sensing path 12, as described in the inventor's U.S. Pat. No. 6,571,642. As discussed above, the provision of an axial streamlined body 14 supported by a vane 16 defines a quasi-annular sensing path that is appreciably longer than is the corresponding path of a conventional magnetic flow meter in which the sensing path is equal to the internal diameter of the flow tube. The electrodes 18a, 18b, in this depiction, are set in opposite sides of a double-walled vane 16 at some pre-selected radial position that is not adjustable. As noted in the preceding discussion, placing the electrodes at the intersection of the vane and the inner wall of the flow tube would provide a maximum length for the sensing path, even though some other radial position might provide superior linearity.

Figure 2:
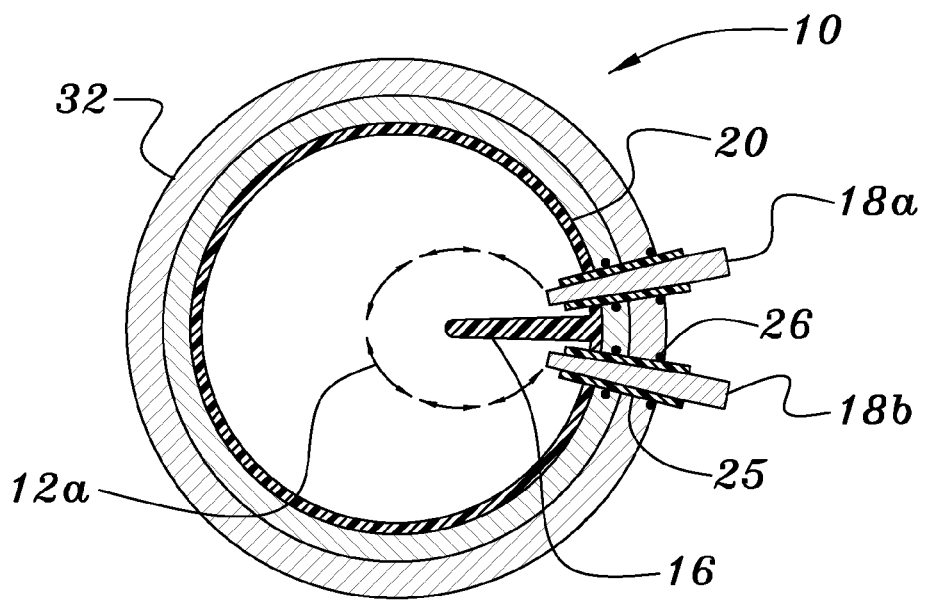
FIG. 2 is a cross-sectional view of a flow meter of the invention that is similar to the flow meter of FIG. 1, save for the electrodes being mounted in the tube wall and the protruding insulating body comprising a vane, rather than a streamlined body supported by a vane.

An embodiment of a portion of a flow meter 10 of the invention is depicted in FIG. 2. This device differs from the prior art device depicted in FIG. 1 in that: 1) the electrodes 18a, 18b are mounted through the wall of the flow tube 20; 2) the electrodes are mounted in a way that allows them to be translated along their axes, which is approximately along a radius of the flow tube 20; and 3) the flow-obstructing vane 16 does not support a streamlined body extending along the axis of the flow tube. The depicted vane provides a somewhat shorter voltage sensing path 12a than is found in the arrangement of FIG. 1. This is disadvantageous, but provides for a lower pressure drop through the meter. Moreover, the reader will appreciate that although a vane is shown in some figures of the drawing other flow obstructions, such as a tube or a streamlined body, could also be used.

The reader will understand that although a relatively short vane is depicted in FIG. 2, many other possibilities exist. For example, the vane could extend nearly across the flow tube, leaving only a small passage to complete the voltage sensing path. Moreover, the provision of a conducting pin extending through the vane, as depicted in the inventor's pending U.S. patent application Ser. No. 12/325,016, the disclosure of which is incorporated herein by reference, would allow the vane to extend fully across the flow tube so as to form a septum.

In some embodiments of the invention, as depicted in FIGS. 3 and 4, a threaded engagement 22 between the electrode and the flow tube can be used to adjust the radial position of the electrode. If the flow tube is made of an insulating material, a threaded electrode can engage a tapped hole in the wall of the flow tube, as depicted in FIG. 3. On the other hand, if flow is being measured in a metal pipe, the electrodes can be embedded in insulating sheathes 25 that can threadably engage either the pipe, or an insulating insert 24, as depicted in FIGS. 4 and 5.

It will be recognized that there are other, non-threaded, arrangements for providing radial adjustments of the electrodes. In the depiction of FIG. 6, for example, smooth, cylindrical electrodes 18a, 18b pass through an O-ring 26 and are held at a selected position by a cap 28 clamped to the flow tube by means of a screw 30 used to hold a vane 16 and an inner axial flow tube 15 of the sort described in the inventor's U.S. patent application Ser. No. 12/206,881, filed Sep. 9, 2008, the disclosure of which is herein incorporated by reference.

It may be noted that if the electrode positions are fixed within a vane, as in FIG. 1, one could provide a mechanism (not shown) to slide the vane radially. This would allow one to adjust the radial position of both electrodes simultaneously, but would not permit individual adjustments.

The use of insulating sheathes 25 on the electrodes 18 provides for more than just electrical isolation from a metal pipe 32. Sheathes extending to, or nearly to, the exposed tip of an electrode 18, as depicted in FIG. 4, provides a more precise definition of the sensing path, in that only the tip of the electrode is exposed to the fluid. An unsheathed electrode, as depicted in FIG. 3, may be simpler to implement in some cases. The unsheathed design also provides more active surface area for the electrode and does allow for radial adjustment with some sort of averaged sensing path.

In some embodiments the vane 16 or septum may have grooves 34 arranged to receive the electrodes. This provides for a maximum quasi-annular path. In addition, in some configurations, the electrodes may be used to retain the vane.

Some embodiments of the invention provide a magnetic flow meter in which the positions of at least one of electrodes can be controlled by means of a suitable adjustment mechanism, such as the threaded fittings shown in FIGS. 3 and 4. In other embodiments, one may choose to make a test meter having adjustable electrode depth and use that test meter to establish an optimal electrode depth. Following those experiments, one could then make a set of production meters having the electrodes inserted to the selected optimal dept and held in that position by means that do not provide for further adjustment but that may hold the electrodes more reliably over a long time period or that may be less expensive than are the adjustable mountings.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

What is claimed is:

1. Apparatus for measuring the flow rate of a fluid in a tube, the apparatus comprising: an electrically insulating member extending inward from an inner wall of the tube, the insulating member extending along a selected axial portion of the tube; the apparatus further comprising at least one pair of electrodes respectively disposed adjacent opposite sides of the insulating member at a selected axial position, at least one of the electrodes having associated therewith a respective adjustment mechanism operable to move the respective electrode radially within the tube.

2. The apparatus of claim 1 wherein each of the at least one pair of electrodes abuts the respective side of the insulating member.

3. The apparatus of claim 1 wherein the insulating member comprises at least one radial groove on each of two spaced apart sides and wherein each of the electrodes is disposed within a respective groove.

4. The apparatus of claim 1 wherein each of the electrodes comprises an exposed metal portion distal from the inner wall of the tube and an electrically insulated portion adjacent the inner wall of the tube.

5. The apparatus of claim 1 further comprising a streamlined body centered within the tube and supported by the insulating member, the streamlined body defining a quasi-annular voltage sensing path.

6. The apparatus of claim 1 further comprising an inner axial flow tube supported by the insulating member, the inner axial flow tube defining a quasi-annular sensing path.

7. The apparatus of claim 1 wherein each adjustment mechanism comprises a respective feed screw threadably movable with respect to the wall of the tube.

8. A method of selecting a signal generating path within a magnetic flow meter, the method comprising the steps of:
   a) providing a magnetic flow meter comprising an electrically insulating member extending radially inward from an inner wall of a tube in which a flow of fluid is to be measured, the flow meter further comprising at least one pair of electrodes respectively disposed on opposite sides of the insulating member at a selected axial position, at least one of the electrodes having associated therewith a respective adjustment mechanism operable to move the respective electrode radially within the tube;
   b) causing the fluid to flow at flow rates within a selected range and measuring an output of the flow meter for rates within the selected range;
   c) employing the adjustment mechanism to move at least one electrode in the at least one pair thereof; and
   d) repeating steps b) and c) until a position associated with an optimal output is obtained.

9. The method of claim 8 wherein the optimal output varies linearly with the volumetric flow rate.

10. The method of claim 8 wherein the optimal output is a maximum output.

* * * * *